June 29, 1926. 1,590,568
M. P. FINNEGAN
AUTOMOBILE TIRE LINER
Filed Feb. 21, 1925
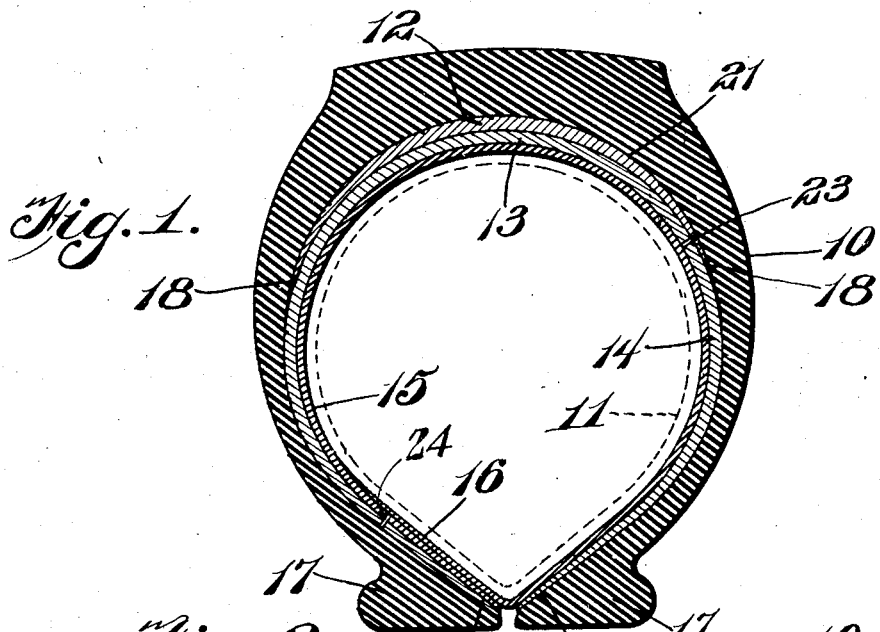
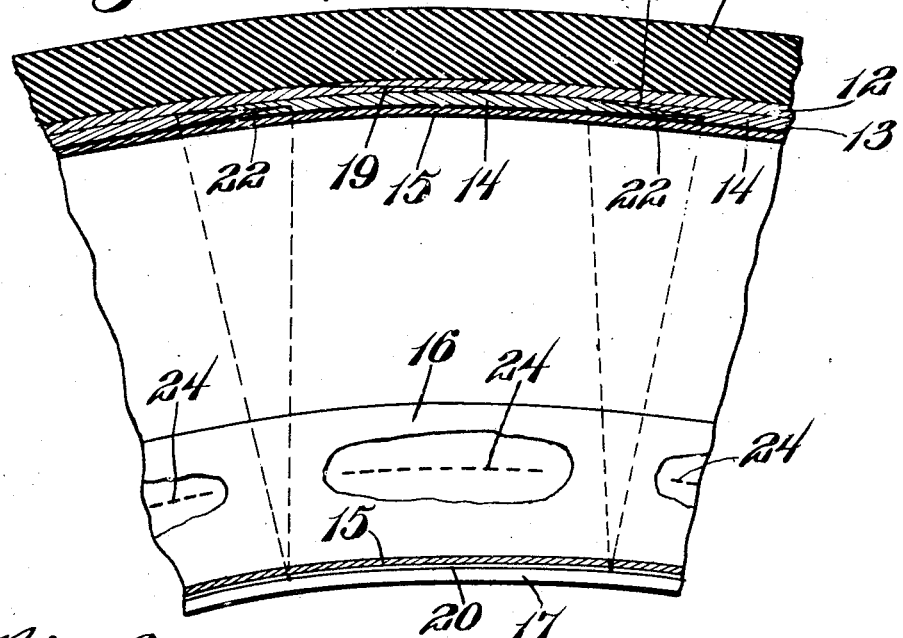
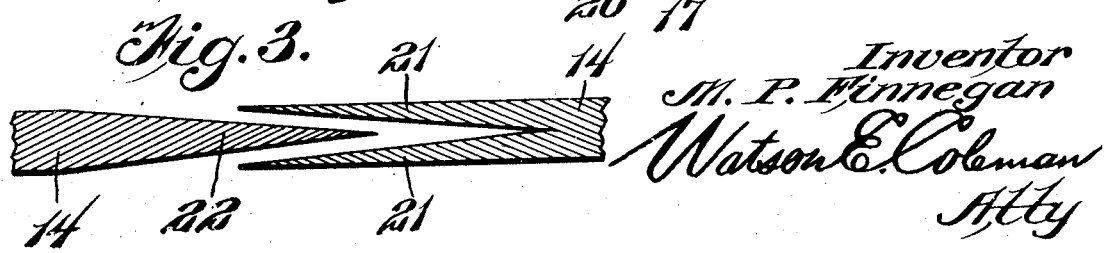
Inventor
M. P. Finnegan
Watson E. Coleman
Atty Patented June 29, 1926.

1,590,568

UNITED STATES PATENT OFFICE.

MIKE P. FINNEGAN, OF NEWTON, MISSISSIPPI.

AUTOMOBILE TIRE LINER.

Application filed February 21, 1925. Serial No. 10,901.

This invention relates to automobile tire liners.

An important object of the invention is the provision of a liner which will enable the use of a tire as long as there is sufficient resistance in the tire to maintain the liner in the proper form.

A further object of the invention is to provide a device of this character formed in a plurality of layers, certain outer layers of which are formed of puncture resisting material and so formed that they are independently movable so that the resistance of one of the layers is not applied to the resistance of the other layer to stiffen the same and thus render it more readily punctured, it being well known that a surface which is stiffly held is more readily punctured than one which may yield.

A further and more specific object of the invention is to provide a device of this character having an outer circumferentially extending puncture proof section and an inner section consisting of a plurality of interdigitating leaves extending transversely of the tire and each capable of a limited movement independent of the outer layer and independently of the leaves of the same layer. This structure may be and preferably is combined with an inner shield layer protecting the inner tube of the tire against the shifting action of the leaves of the second layer.

These and other objects I attain by the construction shown in the accompanying drawings, wherein for the purpose of illustration is shown a preferred embodiment of my invention and wherein:—

Figure 1 is a vertical transverse sectional view through a tire having a liner arranged therein constructed in accordance with my invention;

Figure 2 is a longitudinal sectional view therethrough;

Figure 3 is an enlarged detailed view showing the joint adjacent leaves of the intermediate ply.

Referring now more particularly to the drawings, the numeral 10 generally designates a tire of the character usually employed on automobiles and 11 the inner tube of the tire. The boot structure in accordance with my invention includes an outer layer 12 extending circumferentially of the tire and of such width that it extends approximately half way down the side walls of the tire, as indicated, a second layer 13 formed of interdigitating leaves 14 and layers formed of puncture proof material, this second layer extending completely around the inner walls of the tire and a third or inner layer 15 formed of soft and more readily puncturable material extending completely around the tire and in addition having a flap 16 closing the opening between the beads 17 of the tire.

The section 12 is formed from cowhide of the proper length and diameter to fit the inner wall of the tire with which it is to be associated. The side edges of this section are preferably feathered, as indicated at 18, and the end edges thereof may have a feathered overlap 19 which may be spliced or otherwise secured together.

The section 13 as hereinbefore stated consists of a plurality of leaves 14. Each leaf 14 is of a length equal to the internal circumference of the tire so that the ends 20 of the leaves will coincide with the edges of the beads. The section is preferably tapered in thickness from its central or tread opposing portion 21 to these ends 20 and each section has one side edge thereof split to form flaps 21 and its opposite side edge feathered to form a single finger 22 adapted to enter between the flaps 21 of an adjacent section. The splitting to form the flaps 21 is preferably such that the placement of the feathered edge 22 between these flaps will not enlarge the thickness at the point of formation of the joint. No connection between the sections 14 is had with the exception of this interdigitation thereof. The inner ply 15 is preferably formed of vulcanized layers of rubber and cotton fabric but may be of any suitable character. This layer should, however, be formed of some relatively soft and resilient material protecting the inner tube 11 against movement of the sections 14 with relation to one another and against possible pinching at the point of interdigitation between the sections. The outer flap 12 is secured to each section 14 at one point only and this point, indicated at 23, is adjacent one side edge of the flap 12 so that independent movement of the sections is not materially interfered with and at the same time, the assembly of the sections is maintained. Similarly, each section 14 is attached to the inner ply 15 by a short row of stitching 24, this row of stitching being arranged at the opposite side of the tire from the stitching 23 and adjacent the extremity 20 of the section 14 at this side of the tire.

In the use of the device, it will be obvious that any pressure applied to the outer surface of the tire will be transmitted to the outer ply 12, through this ply 12 to the inner ply 13, the sections of which will be permitted to shift to compensate for the pressure and finally to the inner tube. If an element enters through the tread of the tire and through the outer ply 12, it will engage with the inner ply and as each section of this inner ply 13 is separated, movement will be resisted only by that particular section which is engaged. It will, of course, be obvious that to accomplish this, the sections of the inner ply must be pliable. For this reason, these sections are formed of leather. The resistance to the movement of this section being relatively slight, the puncturing element will very possibly not pass through such inner ply and the only effect will be a movement of the section of the inner ply at its point of connection with the adjacent sections and an application of a slightly excessive pressure upon the tube at the point of movement. The outer section will serve to reinforce against any movement of the inner section 13 and will serve as a complete blow-out patch extending completely around the tire. Since the interdigitation of the sections 14 extends to the ends thereof, as indicated, it will be obvious that a protection is provided against blow-outs occurring not only at the tread of the tire but at the side walls thereof.

The structure hereinbefore set forth is obviously capable of a considerable range of change and modification without materially departing from the spirit of my invention and I accordingly do not limit myself to such specific structure except as hereinafter claimed.

I claim:—

A liner for vehicle tires including a layer composed of transversely extending sections each having one side edge thereof tapered to a feather edge and the opposite side edge thereof split and formed to provide arms adapted to receive therebetween the feather edge of a second section.

In testimony whereof I hereunto affix my signature.

MIKE P. FINNEGAN.